United States Patent [19]

Kohlpaintner et al.

[11] 4,337,974
[45] Jul. 6, 1982

[54] VEHICLE ROOF

[75] Inventors: Georg Kohlpaintner, Maisach; Wolfgang Rottenfusser, Hanfeld, both of Fed. Rep. of Germany

[73] Assignee: Webasto-Werk W. Baier GmbH & Co., Munich, Fed. Rep. of Germany

[21] Appl. No.: 99,825

[22] Filed: Dec. 3, 1979

[30] Foreign Application Priority Data

Dec. 1, 1978 [DE] Fed. Rep. of Germany ....... 2851939

[51] Int. Cl.³ .............................................. B60J 7/04
[52] U.S. Cl. .................................. 296/214; 296/216; 411/502; 411/509
[58] Field of Search ............... 296/214, 210, 216, 221, 296/222, 223; 151/41.71; 85/32 K; 24/208 A

[56] References Cited

U.S. PATENT DOCUMENTS

| 2,705,991 | 4/1955 | Reiner | 151/41.71 |
| 3,008,554 | 11/1961 | Hodgson | 151/41.71 |
| 3,078,122 | 2/1963 | Werner | 296/222 |
| 3,905,640 | 9/1975 | Lutz | 296/222 |
| 3,982,783 | 9/1976 | Vermeulen | 296/214 |

FOREIGN PATENT DOCUMENTS 1269612 4/1972 United Kingdom ............... 296/214

Primary Examiner—Joseph F. Peters, Jr.
Assistant Examiner—Ross Weaver
Attorney, Agent, or Firm—Craig and Antonelli

[57] ABSTRACT

A vehicle body structure such as a roof with a roof aperture surrounded by a frame, the latter defining, at least in the zone of the front edge and the lateral edges of the roof aperture, a gutter having a U-shaped cross-section, wherein the roof aperture can be closed by a sliding top as displaced via sliding blocks in guide tracks extending along the lateral edges of the roof aperture. According to a preferred embodiment, these guide tracks each have a vertical wall defining a side of the gutter that is located nearest the roof aperture that has the shape of an inverted U in cross-section, and a mounting strip is provided within a cavity of the inverted U-shape cross-section such that screws for attaching a cover (forming an upper wall of the guide track) are fastened to the top side of the vertical wall by extending therethrough into the holes in the mounting strip.

5 Claims, 3 Drawing Figures

VEHICLE ROOF

BACKGROUND AND SUMMARY OF THE INVENTION

The invention relates to a vehicle body structure such as a roof with a roof aperture surrounded by a frame, the latter defining, at least in the zone of the front edge and the lateral edges of the roof aperture, a gutter having a U-shaped cross section, wherein the roof aperture can be closed by a sliding top displaceable via sliding blocks in guide tracks extending along the lateral edges of the roof aperture, these guide tracks each being formed on a vertical wall defining a side of the gutter located nearest the roof aperture and having the shape of an inverted "U" ($\Omega$) in cross section and further being formed from a cover attached by screws to the topside of the vertical wall.

For reasons of saving weight, the frame is constructed to be as lightweight as possible, i.e. either from a thin steel sheet or also from a light metal such as aluminum. In this connection, problems are encountered with regard to the mounting of the cover at the vertical wall delimiting the gutter, since the holes for the mounting screws of the cover are occasionally torn out (stripped) as early as during the first assembly, but more frequently during repeated installation and disassembly, resulting in expensive remachining.

The invention thus has an object of avoiding these difficulties and attaining a secure mounting of the cover.

To attain this object, it is proposed acording to and embodiment of the invention to arrange, in the cavity of the vertical wall, a mounting strip provided with screw holes for the screws serving to attach the cover.

By means of this embodiment according to the invention, a secure fastening of the mounting screws is obtained, so that even a repeated disassembly and assembly of the cover does not entail any problems.

In a vehicle roof wherein the gutter is also defined along the front edge of the roof aperture toward the roof aperture by a vertical wall having a -shaped cross section, a cover being attached by screws to the topside of this wall, the preferred embodiment of the invention provides a mounting strip with screw holes for the screws serving to attach the forward cover also in the cavity of this forward, vertical wall. This forward cover serves, for example, for covering a channel wherein pressure-resistant cables are guided for the displacement of the sliding top.

Recently, rigid headliners have been utilized as the interior lining of vehicle roofs; these headliners normally consist of a synthetic resin and are snapped into corresponding mounting devices on the inside of the vehicle roof. The use of such rigid headliners in a vehicle roof with a roof aperture which can be closed by a sliding top has presented certain difficulties with respect to the mounting of the headliner along the edges of the roof aperture. In one suggestion disclosed by German Utility Model No. 7,709,851, the edges of the headliner defining the roof cutout are pulled upward so that they extend over the edges of the frame. To attain a secure mounting of the headliner in this arrangement, only very narrow tolerances can be permitted, but even then, due to the varying thermal expansion coefficients of the metallic roof frame and the headliner made of a synthetic resin, a safe mounting is not always ensured. Screwing or clipping the headliner to the frame has met with difficulties, since, on the one hand, the penetration of a gutter wall is to be avoided while, on the other hand, there is hardly any room for the accommodation of mounting elements. In accordance with a further aspect of the preferred embodiment, a secure attachment of the headliner can be attained by providing, in the mounting strips, additional openings for the accommodation of fastening elements for the headliner.

The mounting strips are held in place by the mounting screws of the cover. To facilitate assembly, the mounting strips can additionally be attached to the frame by means of plastic rivets.

The mounting strips are preferably made of a synthetic resin.

These and other objects, features and advantages of the present invention will become more apparent from the following description when taken in connection with the accompanying drawings, which show, for purposes of illustration only, a single embodiment in accordance with the present invention.

DETAILED DESCRIPTION OF THE PREFERRED EMBODIMENT

Figure 1:
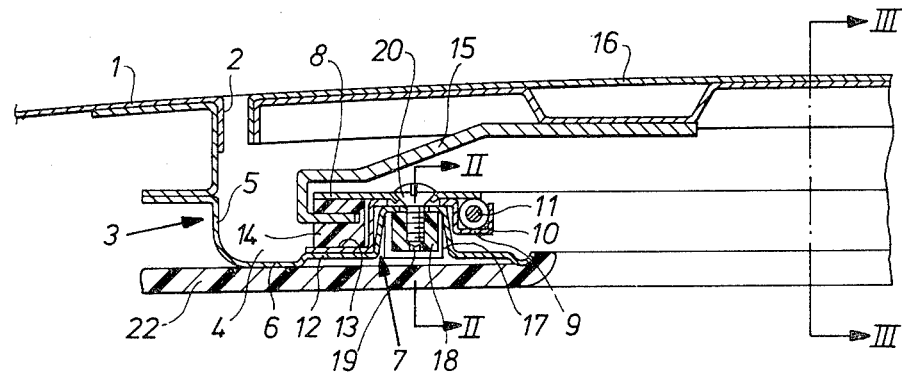
FIG. 1 shows a partial cross-sectional view of a vehicle roof at right angles to the longitudinal extension of the vehicle roof, wherein the section plane is extended through a lateral edge of the roof aperture.

In the drawing, 1 denotes the vehicle roof provided with a rectangular roof aperture 2 surrounded by a frame 3; the frame defines, at least in the zone of the front edge and the lateral edges of the roof aperture 2, a gutter 4 having a U-shaped cross section. For this purpose, the frame 3 comprises, along the lateral edges of the roof aperture 2, an external vertical wall 5, a bottom 6, and an inner vertical wall 7. This inner wall 7 has a $\Omega$-shaped cross section and carries on its topside a cover 8 which, in the embodiment shown, projects on both sides beyond the wall 7 and defines a channel 10 for the guidance of a pressure-resistant cable 11 on the inside with a guide plate 9 having a U-shaped cross section and defines a guide track 13 for a sliding block 14 on the outside with the bottom 6 of the gutter 4 and/or with a flange 12 of the plate 9. The sliding block 14 is connected via a supporting element 15 to a sliding top 16 which can be displaced by means of the cable 11 to cover or open the roof aperture 2.

Figure 2:
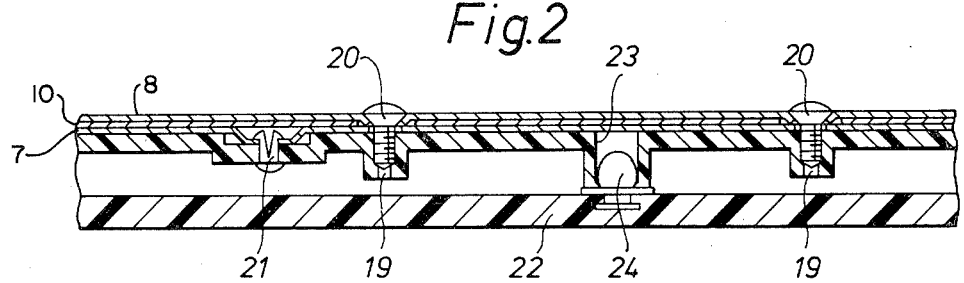
FIG. 2 shows a section along line II—II in FIG. 1.

In order to mount the cover 8 to the frame 3, a mounting strip 18 is inserted in the cavity 17 of the boundary wall 7, which latter has a $\Omega$-shape in cross section. This mounting strip is provided with holes 19 to accommodate screws 20 by means of which the cover 8 is screwed to the mounting strip 18. The mounting strip 18 is likewise attached to the frame 3 by means of the screws 20 but, in order to facilitate assembly, a separate fastening of the mounting strip 18 to the frame 3 is provided by means of simple plastic expansion rivets 21 (FIG. 2).

The roof 1 and the frame 3 are covered on their side facing toward the interior of the vehicle by a rigid headliner 22. To attach the headliner 22 to the frame 3 in the zone of the roof aperture 2, openings 23 are arranged in the mounting strip 18, these openings receiving mounting elements 24 for the headliner 22. These mounting elements 24 can be customary clips or clamps as they are utilized, for example, for the attachment of door paneling at automobile doors, which are embeded within the headliner 22.

On account of the arrangement of the mounting strip 18, a tearing out of the screw holes receiving the mounting screws 20 is avoided, since these screw holes are disposed in the mounting strip 18 rather than in the wall 7 of the frame 3, as was done heretofore. This arrangement according to the invention also permits the construction of the frame 3 from a light metal such as aluminum, which up to now has been impossible.

Figure 3:
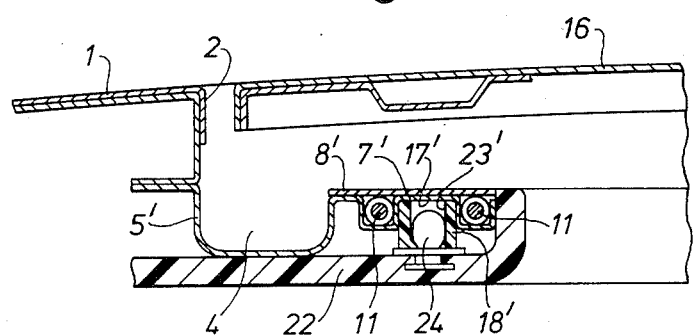
FIG. 3 shows a section along line III—III in FIG. 1.

FIG. 3 shows a section through the front edge of the roof aperture 2 along line III—III in FIG. 1. As can be seen therefrom, the gutter 4 is delimited by outer and inner vertical walls 5' and 7' also in the zone of the front edge of the roof aperture 2. The inner wall 7' again has the cross section of a $\Omega$ and carries on its topside a cover 8' which defines at the bottom in the wall 7' guide means for the cables 11 serving for the movement of the sliding top 16. Also in this zone, a mounting strip 18' is provided in the cavity 17' of the wall 7'; this mounting strip contains, on the one hand, holes 19 (not shown) for receiving the mounting screws for the cover 8' and, on the other hand, openings 23' for receiving fastening elements 24 for the headliner 22.

While we have shown and described only a single embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

What is claimed is:

1. Vehicle roof with a roof aperture surrounded by a frame, said frame defining, at least in a zone of a front edge and lateral edges of the roof aperture, a gutter having a U-shaped cross-section, said roof aperture being closeable by a sliding top which is mounted by sliding blocks for displacement in guide tracks extending along the lateral edges of the roof aperture, said guide tracks each being formed on a vertical wall defining a side of the gutter nearest the roof aperture, said vertical wall having the shape of a $\Omega$ in cross section, and a cover attached by screws to the topside of said vertical wall, characterized in that a one-piece mounting strip is arranged in a cavity of the vertical wall, the mounting strip being provided with holes within which the screws serving to attach the cover are fastened to the strip; and wherein a rigid headliner extends up to the edge of the roof aperture, further characterized in that openings for retaining fastening elements for the headliner are provided in the mounting strips.

2. Vehicle roof according to claim 1, wherein the gutter is also delimited along the front edge of the roof aperture, by a vertical wall having a $\Omega$-shaped cross section, a cover being attached by screws to the topside of this front edge vertical wall, characterized in that a one-piece mounting strip, with holes within which the screws for attaching the forward cover are fastened to the strip, is provided in a cavity of the front edge vertical wall.

3. Vehicle roof according to claim 1, characterized in that the mounting strips are held to the roof frame by plastic rivets.

4. Vehicle roof according to claim 2, characterized in that the mounting strips are held to the roof frame by plastic rivets.

5. Vehicle roof according to claims 1 or 2, characterized in that the mounting strips are made of a synthetic resin.

* * * * *